US008964566B2

(12) United States Patent
White et al.

(10) Patent No.: US 8,964,566 B2
(45) Date of Patent: Feb. 24, 2015

(54) CREATING BALANCED LINK-DISJOINT TOPOLOGIES IN A COMPUTER NETWORK

(75) Inventors: Russell White, Holly Springs, NC (US); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 668 days.

(21) Appl. No.: 12/859,692

(22) Filed: Aug. 19, 2010

(65) Prior Publication Data

US 2012/0044811 A1 Feb. 23, 2012

(51) Int. Cl.
| | |
|---|---|
| *H04L 12/26* | (2006.01) |
| *H04L 12/703* | (2013.01) |
| *H04L 12/751* | (2013.01) |
| *H04L 12/735* | (2013.01) |
| *H04L 12/721* | (2013.01) |
| *H04L 12/715* | (2013.01) |

(52) U.S. Cl.
CPC ............... *H04L 45/28* (2013.01); *H04L 45/02* (2013.01); *H04L 45/1283* (2013.01); *H04L 45/34* (2013.01); *H04L 45/64* (2013.01)
USPC ........................................................ 370/238

(58) Field of Classification Search
USPC ................. 370/216, 221–228, 229, 235, 238
See application file for complete search history.

(56) References Cited

U.S. PATENT DOCUMENTS

| | | | | |
|---|---|---|---|---|
| 5,535,213 A | * | 7/1996 | Pan et al. | 370/258 |
| 6,377,543 B1 | * | 4/2002 | Grover et al. | 370/227 |
| 6,463,033 B1 | * | 10/2002 | Harshavardhana | 370/222 |
| 6,751,746 B1 | * | 6/2004 | Jain et al. | 714/4.12 |
| 7,051,113 B1 | | 5/2006 | Katukam et al. | |
| 7,058,296 B2 | * | 6/2006 | Saniee et al. | 398/3 |
| 7,200,104 B2 | * | 4/2007 | Saleh et al. | 370/216 |
| 7,373,543 B1 | | 5/2008 | Jain et al. | |
| 7,477,594 B2 | | 1/2009 | Saleh et al. | |
| 7,490,165 B1 | | 2/2009 | Katukam et al. | |
| 7,542,414 B1 | | 6/2009 | Katukam | |
| 7,558,218 B1 | | 7/2009 | Swallow | |
| 7,609,624 B2 | * | 10/2009 | Alicherry et al. | 370/228 |
| 7,633,949 B2 | | 12/2009 | Zadikian et al. | |
| 7,693,061 B2 | | 4/2010 | El-Sakkout et al. | |

(Continued)

OTHER PUBLICATIONS

"Notification of Transmittal of the International Search Report and the Written Opinion of the International Searching Authority, or the Declaration," International Filing Date: Jul. 25, 2011, International Application No. PCT/US2011/001311, Applicant: CISCO Technology, Inc., Date of Mailing: Nov. 4, 2011, pp. 1-14.

(Continued)

*Primary Examiner* — Chi H Pham
*Assistant Examiner* — Robert Lopata
(74) *Attorney, Agent, or Firm* — Novak Druce Connolly Bove + Quigg LLP

(57) ABSTRACT

In one embodiment, each node in a computer network determines a shortest looping ring back to the node through each of its neighbors. Each of these rings may then be marked in a particular direction, ensuring that any ring that shares a link with another ring is marked in such a way that the shared link is in the same direction in each of the rings that share the link. The links that are marked in the particular direction may be stored as part of a first topology. Conversely, the opposite direction on the links (e.g., bidirectional links or parallel unidirectional links) may be stored as a second topology that is link-disjoint from the first topology.

22 Claims, 11 Drawing Sheets

(56) References Cited

U.S. PATENT DOCUMENTS

| | | | |
|---|---|---|---|
| 7,715,713 B1* | 5/2010 | Iyer et al. | 398/58 |
| 7,830,785 B2* | 11/2010 | Li et al. | 370/216 |
| 7,869,344 B1* | 1/2011 | Kamal et al. | 370/216 |
| 7,876,672 B2* | 1/2011 | Chao et al. | 370/218 |
| 7,961,596 B2* | 6/2011 | Maruyoshi et al. | 370/217 |
| 2006/0250948 A1 | 11/2006 | Zamfir et al. | |
| 2009/0016311 A1 | 1/2009 | Wu et al. | |
| 2009/0190478 A1 | 7/2009 | Li et al. | |
| 2009/0201805 A1 | 8/2009 | Begen et al. | |
| 2011/0170406 A1* | 7/2011 | Krishnaswamy | 370/222 |

OTHER PUBLICATIONS

Kiaei, Mohannad S., et al., "A Survey on the p-Cycle Protection Method," IEEE Communications Surveys & Tutorials, vol. 11, No. 3, Oct. 1, 2009, pp. 53-70.

Ellinas, Georgios, et al., "Protection Cycles in Mesh WDM Networks," IEEE Journal on Selected Areas in Communications, vol. 18, No. 10, Oct. 2000, pp. 1924-1937.

Wasem, Ondria, "Optimal Topologies for Survivable Fiber Optic Networks Using Sonet Self-Healing Rings," Global Telecommunications Conference, GLOBECOM'91, IEEE, Dec. 2, 1991, pp. 2032-2038.

Ellinas, Georgios, et al., "Automatic Protection Switching for Link Failures in Optical Networks with Bi-directional Links," Global Telecommunications Conference, GLOBECOM'96, IEEE, Nov. 1996, pp. 152-156.

Pin-Han, Ho, "State-of-the-Art Progress in Developing Survivable Routing Schemes in Mesh WDM Networks," IEEE Communications Surveys, IEEE, vol. 2, No. 4, Oct. 1, 2004, pp. 2-16.

Gardner, L. M., et al., "Techniques for Finding Ring Covers in Survivable Networks," Proceedings of the Global Telecommunications Conference, GLOBECOM, IEEE, vol. 3, Nov. 28, 1994, pp. 1862-1866.

Ellinas, Georgios, et al., "Planar-Subgraph and Eulerian-Based Techniques for Determining Protection Ring Covers in Mesh Optical Networks," IEEE/OSA Journal of Optical Communications and Networking, IEEE, Optical Society of America, vol. 1, No. 1, Jun. 1, 2009, pp. 142-157.

* cited by examiner

CREATING BALANCED LINK-DISJOINT TOPOLOGIES IN A COMPUTER NETWORK

TECHNICAL FIELD

The present disclosure relates generally to computer networks, and, more particularly, to computing link-disjoint topologies.

BACKGROUND

Link-disjoint paths are two paths of links (edges) through a network that do not have overlapping links, and thus do not share the same fate in the event of a link failure. In other words, if one link fails, it will not impact both of the paths in a disjoint-path pair. A node using one disjoint path to reach a destination may simply switch to an alternate disjoint path, or topology, to reach the same destination without causing a forwarding loop in the network. There are a number of mechanisms that can be used to find link-disjoint paths in any given network topology simply and easily, in a distributed manner. However, the problem with these current mechanisms is that they typically generate disjoint paths that may have vastly different lengths (e.g., costs), where the computed disjoint path is typically much longer than another path computed by conventional routing algorithms.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, each node in a computer network determines a shortest looping ring back to the node through each of its neighbors. Each of these rings may then be marked in a particular direction, ensuring that any ring that shares a link with another ring is marked in such a way that the shared link is in the same direction in each of the rings that share the link. The links that are marked in the particular direction may be stored as part of a first topology. Conversely, the opposite direction on the links (e.g., bidirectional links or parallel unidirectional links) may be stored as a second topology that is link-disjoint from the first topology.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into is multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains.

Figure 1:
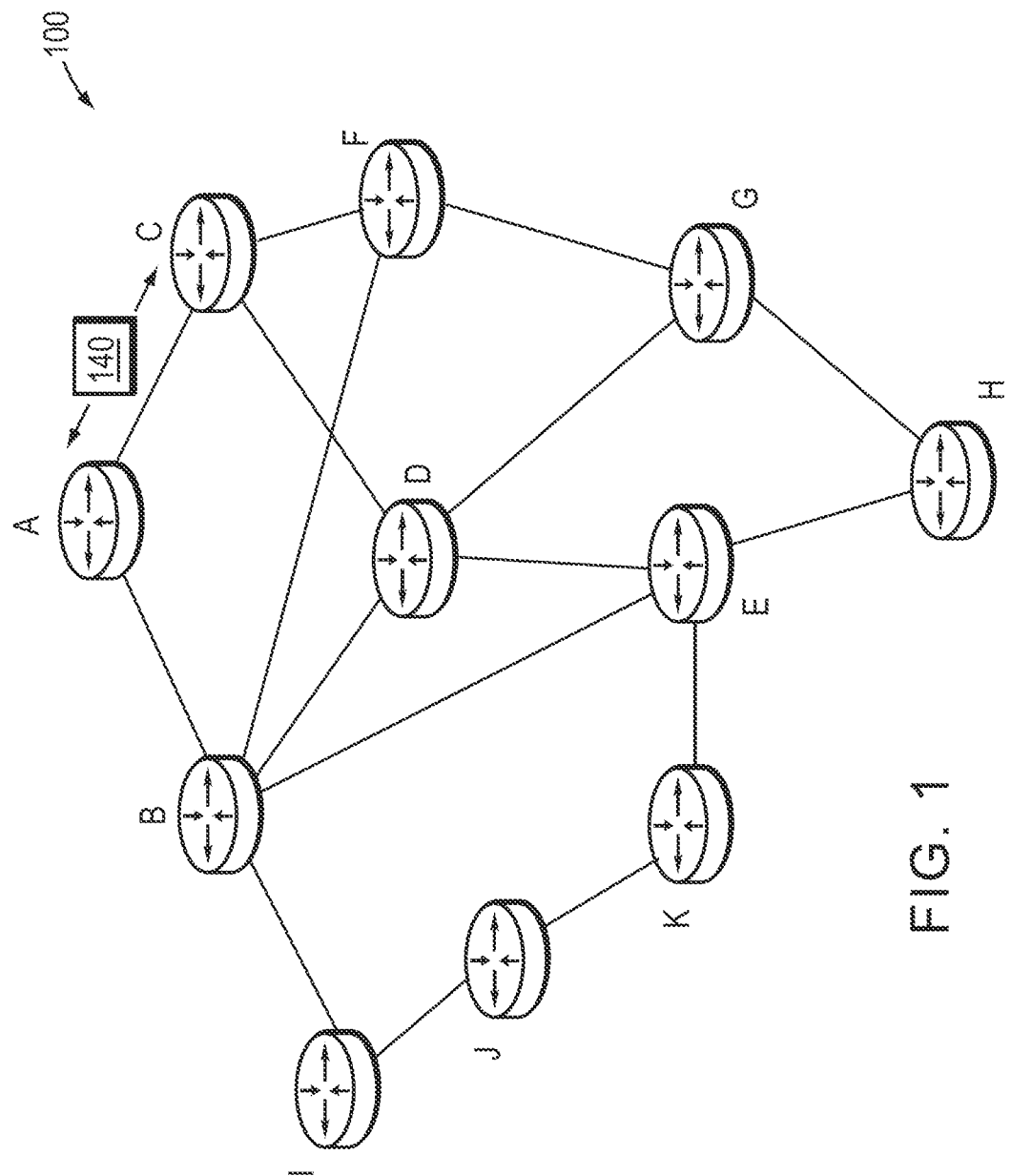
FIG. 1 illustrates an example computer network.

FIG. 1 is a schematic block diagram of an example computer network 100 illustratively comprising nodes/devices, such as one or more nodes (e.g., routers) A-K interconnected by links as shown. The nodes shown may be interconnected to other nodes, or other end devices (e.g., terminals, work stations, customer equipment, etc.), and the view shown herein is for simplicity. That is, any number of nodes, devices, links, etc. may be used in the computer network, and that the view shown herein is only for illustrative purposes.

Data packets 140 (e.g., traffic or messages) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
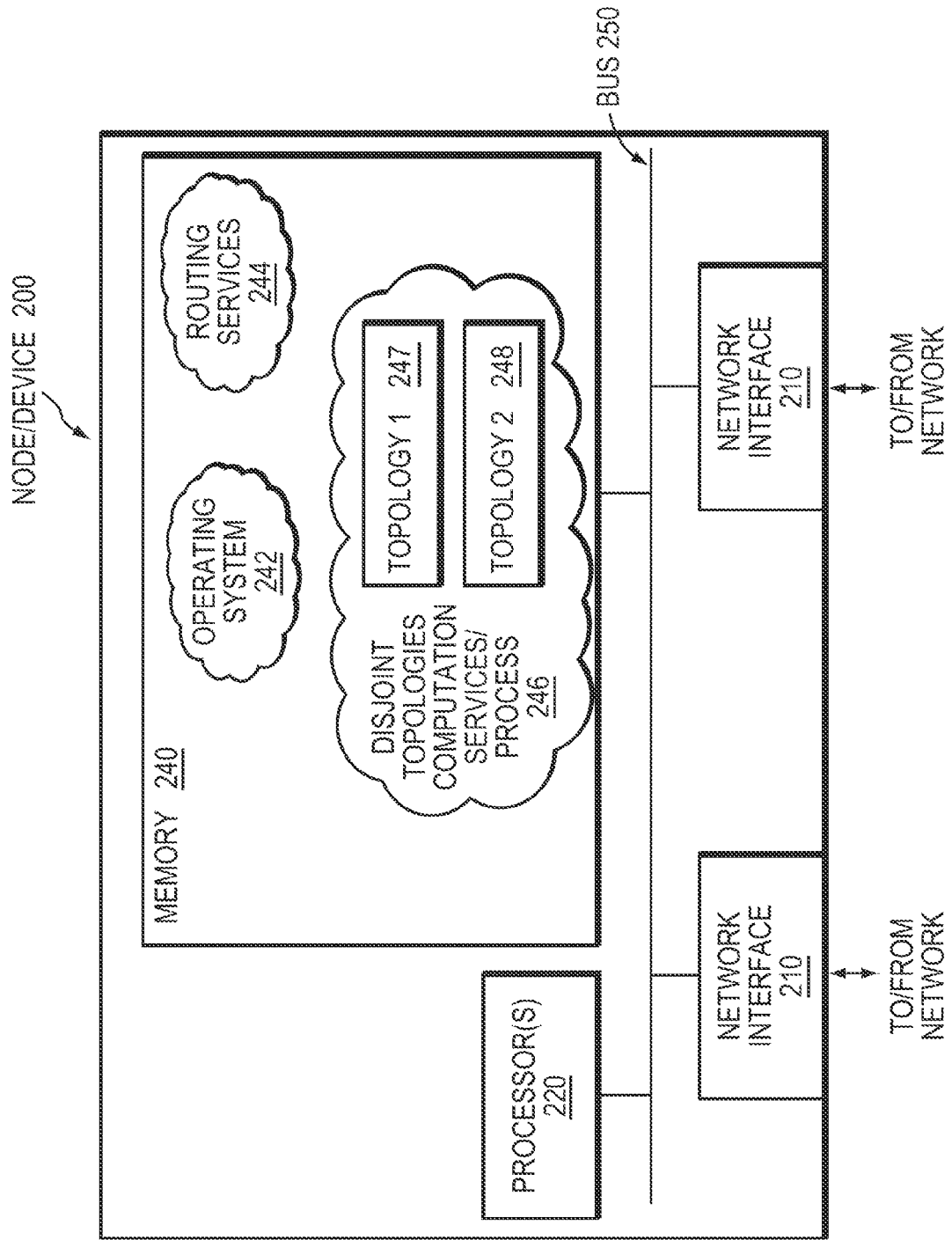
FIG. 2 illustrates an example network device/node.

FIG. 2 is a schematic block diagram of an example node/device 200 that may be used with one or more embodiments described herein, e.g., as a router. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. Illustratively, the links may be bidirectional links, able to transmit and receive traffic, or, alternatively, may be parallel pairs of unidirectional links in opposing directions (one to transmit, one to receive). The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244 and an illustrative disjoint topologies computation process/service 246 as described herein. It will be apparent to those skilled in the art that other types of processors and memory, including various computer-readable media, may be used to store and execute program instructions pertaining to the techniques described herein. It is also noted herein that any of the processes may alternatively be embodied as modules, composed of software, hardware, firmware, or any combination thereof.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. For example, the forwarding decisions result in a path through the network, based on the underlying topology. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances, or tunneling protocols, such as for Multi-Protocol Label Switching, etc., each as will be understood by those skilled in the art.

As noted above, link-disjoint paths are two paths of links (edges) through a network that do not have overlapping links, and thus do not share the same fate in the event of a link failure. In other words, if one link fails, it will not impact both of the paths in a disjoint-path pair. A node using one disjoint path to reach a destination may simply switch to an alternate disjoint path, or topology, to reach the same destination without causing a forwarding loop in the network. There are a number of mechanisms that can be used to find link-disjoint paths in any given network topology simply and easily, in a distributed manner. However, the problem with these current mechanisms is that they typically generate disjoint paths that may have vastly different lengths (e.g., costs), where the computed disjoint path is typically much longer than another path computed by conventional routing algorithms. In fact, sometimes these paths are so long as to make the algorithm of questionable value in real networks. As an extreme example for illustration, imagine that the first low cost (short length) path comprises links directly between New York and Boston, and the second disjoint path that is high cost (long length) comprises links that circumnavigate the globe (i.e., goes west from New York to get to Boston). Surely, while these paths are diverse, they are not optimally so, as they are immensely unbalanced, to the point where the second disjoint path is nearly impractical to use.

Balanced Link-Disjoint Topologies

According to one or more embodiments of the disclosure, balanced link-disjoint topologies may be created, thus providing the ability to determine an optimal set of link-disjoint paths through a given network. Assuming that each "link" cost is the same between two nodes (e.g., a given for bidirectional links, and a presumption for parallel unidirectional links), the techniques herein create a balanced set of topologies. That is, a best path won't be chosen for one topology, while some far worse path is chosen for another topology, and the cost between any two nodes on either topology should be the best reasonable cost, given the physical topology at hand. To accomplish this, the techniques herein generate a series of connected counter-rotating rings (loops). If the cost of each ring is the same in each direction, and each direction is assigned one topology, the costs result in the best possible combination of topologies available.

Conventionally, a network is considered as a set of nodes and edges (links), with paths through the network being directed arcs, or perhaps directed vectors, along the edges between nodes from one point on the graph to another. There is another possible way to view a graph, however, which is a set of interconnected rings, given sufficient network redundancy. In addition, it is possible to treat the ring as a unidirectional set of links, and still be able to reach all the nodes and links along the ring. So, for instance, if a ring were "marked" so traffic could only flow in a clockwise direction, all the nodes on the ring would still be reachable. Many ring-based topologies (token ring, resilient packet ring or "RPR," etc.) have taken this directional approach one step further, relying on use of two directions of travel around the ring as two different topologies. For example, this may be used to provide failover for rings, such that if a link fails, traffic is instantly placed on the second ring in the other direction and forwarded without fear of loops. While this technique works well on topologies that are a single continuous ring, it is not directly applicable to other network topologies without modification. The techniques herein, therefore, describe a manner in which two link-disjoint topologies may be built on any network by interconnecting the rings within the topology in the correct direction, particularly by first discovering the rings that describe the entire topology (e.g., in a distributed fashion) and marking the rings (either clockwise or counterclockwise) while making certain the rings interact properly where they overlap.

For example, as described herein, discovering the rings may, though need not, begin at any node on the edge of the network. This node, the "starting point," chooses any neighbor, and finds the shortest path back to itself through that neighbor, i.e., without reutilizing the link between that node and its neighbor. This describes a ring through the topology, where in a ring, each link is traversed only once. This process is repeated, recursively, through the network, until all the rings in the topology are found. Once the rings are discovered (or, alternatively, while the rings are discovered), each node marks one direction along each ring as one topology, and the other direction along each ring as the second topology that is link-disjoint from the first topology. Certain provisions must be in place, however, to ensure that the rings rotate in the correct direction, i.e., that any ring that shares a link with another ring is marked in such a way that the link is in the same direction in each of the rings that share the link. This may be accomplished, for example and as described in greater detail below, by first setting the ring direction along links which are marked already as part of another ring, followed by marking rings that have no previous markings.

Illustratively, the techniques described herein may be performed by hardware, software, and/or firmware, such as in accordance with a disjoint topologies computation process 246, which may contain computer executable instructions executed by the processor 220 to perform functions relating to the novel techniques described herein, e.g., in conjunction with routing process 244 operating in a conventional manner.

Operationally, with reference again to FIG. 1, a first node or "starting point" may be elected or otherwise designated (e.g., node A), such as based on configuration, certain hashing algorithms, etc., for each network where the algorithm is desired. Illustratively, the elected node is located at an edge of a network, though this is not necessary. Notably, a network may consist of any network, sub-network, domain, AS, area, level, etc. This starting point (A) may then choose a single neighbor among its neighbors in some way (e.g., randomly or directed, such as based on node ID), and attempts to find the shortest path back to itself through that neighbor, i.e., a looping ring (or loop). For instance, the starting node may run a "directed SPF" (shortest path first algorithm) through this one neighbor, looking for the shortest path back to itself not using this neighbor to return to itself. Alternative path selection algorithms may be used in addition to the SPF algorithm, such as explorer algorithms, routing information protocol (RIP) path computation algorithms, etc., as may be appreciated by those skilled in the art.

Figure 3:
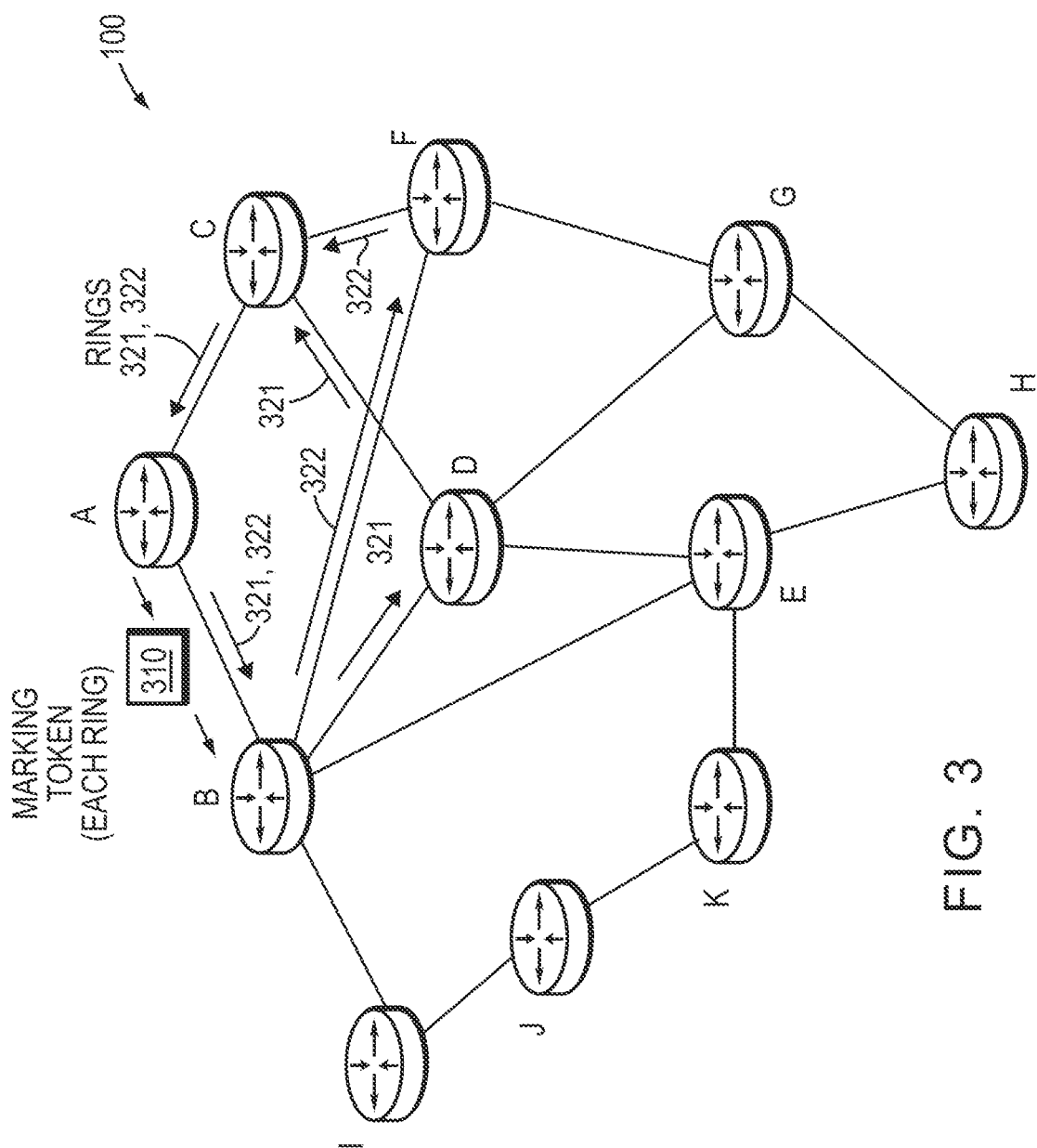
FIGS. 3-8 illustrate an example creation of optimal link-disjoint topologies.

Referring now to FIG. 3, assume that starting node A selects neighbor node B, and attempts to find the shortest looping ring back to itself through B, that is, out from A through B, and back in to A without traversing the B-A link. In this example, assuming equal cost links everywhere in the network, two equal cost paths may be found, specifically: B-D-C-A (ring 321) and B-F-C-A (ring 322). Since in this circumstance two paths are found, each may be selected. Note that if no path is found back to A through the chosen neighbor, this neighbor may be handled in a separate manner (e.g., is "set aside") as described below (with reference to FIG. 9), and another neighbor may be chosen.

Upon determining the ring(s), the ring may be "marked" in a particular direction. For example, the starting node (e.g., node A) may pass a "marking token" 310 along the ring paths, i.e., through the selected neighbor and along the ring back to itself (e.g., A-B-F-C-A and A-B-D-C-A). Various packet transmission techniques may be used to ensure the token 310 follows the ring, such as using source routing (e.g., specifying a hop-by-hop path in the packet), or use some form of "not-via" routing to avoid the neighbor (since the shortest path would be the link directly back to the starting node from the chosen neighbor, without forcing the packet to traverse the ring). Each device along the path receives the marking token, and marks the inbound and outbound links as a first direction (e.g., belonging to the first topology 247), and "marks" the outbound side of the inbound link and the inbound side of the outbound link as a second and opposite direction (e.g., belonging to the second topology 248). For example, node D receives the token 310 from node B, thus the inbound side of link B-D (from B to D) is marked as a first direction, as well as the outbound side of link D-C (from D to C). In addition, the second and opposite direction at node D may be marked based on the received token 310 from node B, where the outbound side of the inbound link B-D (now from D to B) as well as the inbound side of the outbound link D-C (now from C to D) are marked as the second direction, accordingly.

Notably, only one direction in each ring need be specifically marked, since the second topology is always the counter rotation of traffic flow in each ring (or along each link). Note also that in the case of equal cost rings, it must be ensured that any shared links (a link in both rings) are marked in the same direction in each of the sharing rings (e.g., links A-B and C-A of rings 321 and 322).

The starting node may examine its list of neighbors, and if any further neighbors exist that have not been used as an outbound path or an inbound path, and which has not been "set aside," may perform the same steps above on those neighbors to find and mark any additional rings until it has attempted to find shortest paths back to itself through all available neighbors. Notably, when marking each ring in a particular direction, it must be ensured that each ring sharing a link with another ring is marked such that the link is in the same direction in each of the sharing rings. Accordingly, wherever two rings share a link, the rings must be marked such that the link is only marked in one direction, which implies rotating counter to one another for adjacent rings, and in the same direction for non-planar overlapping rings.

Figure 4:
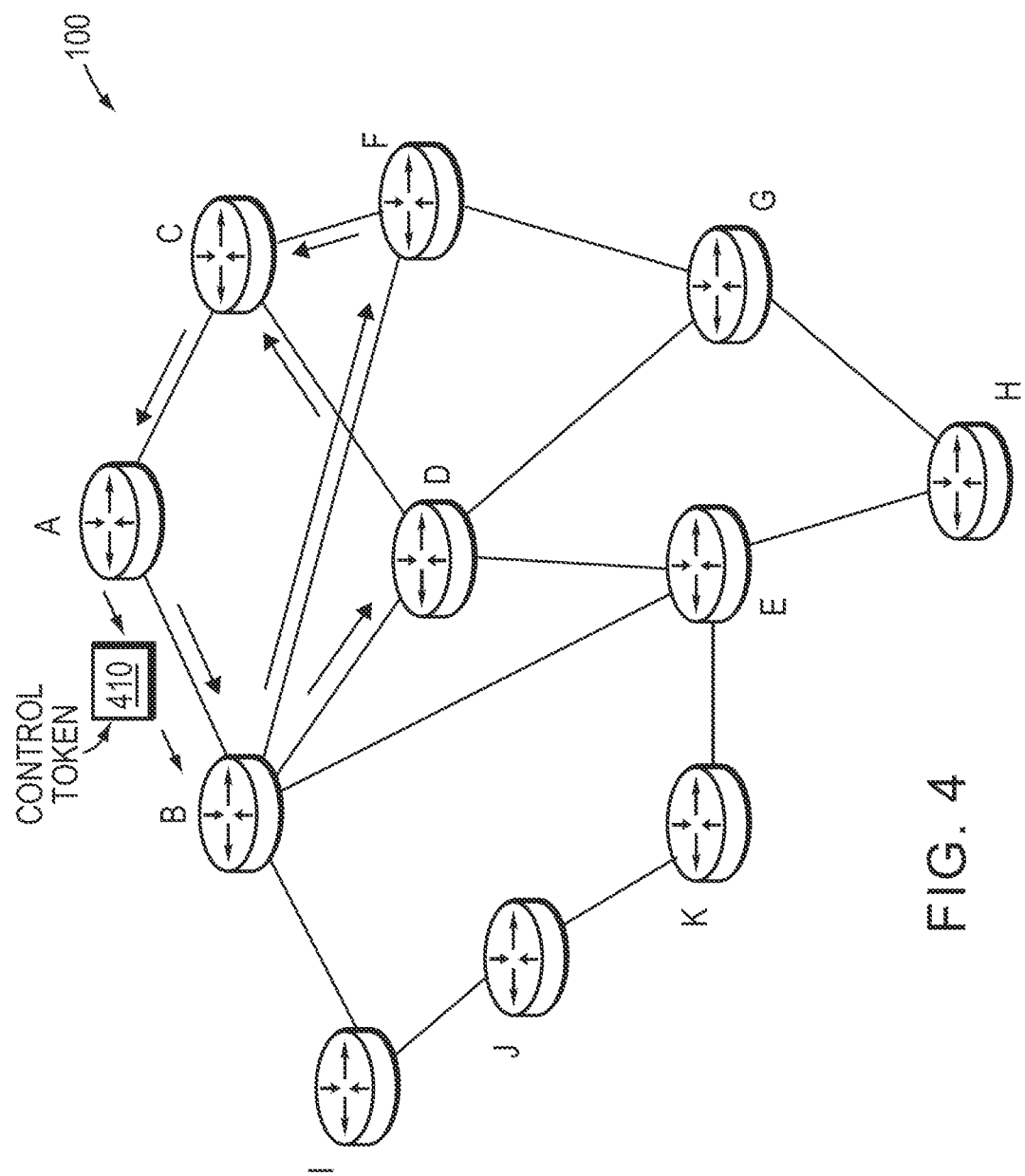

Once there are no more neighbors to explore, the starting node passes a "control token" to one of its neighbors, so that the process above may be repeated, recursively, through the network, until all the rings in the topology are found, and each successive ring marked, at each successive node, based on a previous node's (or ring's) marking. As shown in FIG. 4, a control token 410 may be passed along one of the discovered rings (i.e., in the direction of the already marked ring flow) to a subsequent performing neighbor, e.g., node B. This control token passed to the neighbor node (B) indicates to each successive node receiving the token that the receiving node is to mark its rings (i.e., that the receiving node is now the processing node for the algorithm).

Figure 5:
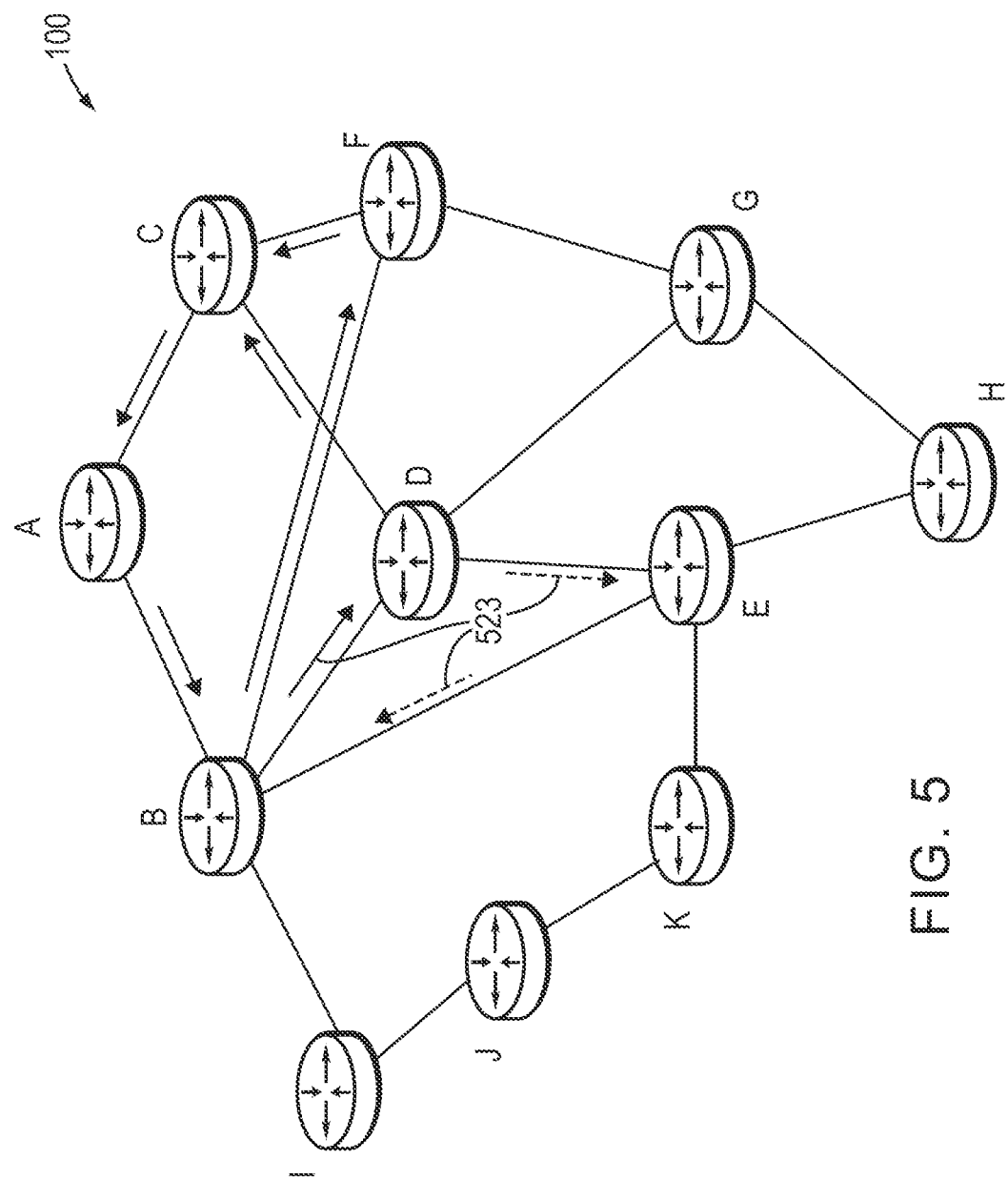

According to one embodiment, the performing neighbor (e.g., B) separates its list of neighbors into two groups: the first group being neighbors towards whom the performing node already has a link marked in the first direction/topology (e.g., node D); and the second group being those to whom the link is not currently marked (e.g., node I). In this manner, the performing node may first mark its successive rings based on a previous node's (ring's) marking, prior to marking rings that do not share links with previously marked rings. For instance, as shown in FIG. 5, the performing node (B) performs the same process as the starting node above (discovering and marking rings) on the first group of neighbors. For example, node B may chose an already marked link to node D, and looks for a shortest loop/ring back to itself through node D, ring 523. When marking the ring, any unmarked link is marked to match the already marked direction, i.e., the direction from B-D-E-B. Once marked, or if already marked (e.g., B-F-C-A-B), then the next neighbor on the first list is explored.

Figure 6:
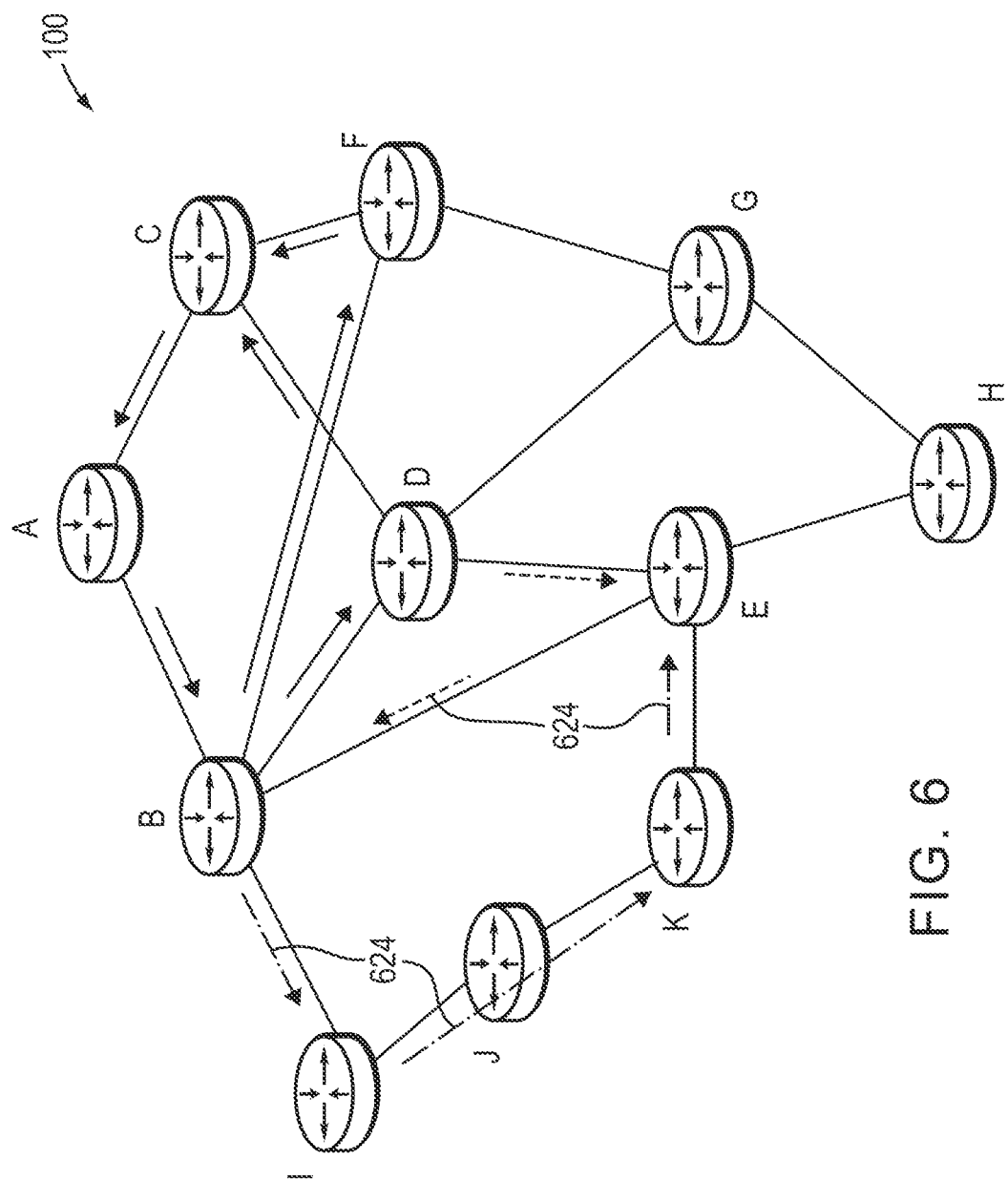

Once the first list is completed, the performing node repeats the process on the second group of neighbors, i.e., those neighbors which are reachable through unmarked links. Referring to FIG. 6, ring 624 may be found through node I. When determining the direction of the newly found ring 624, the performing node matches the known direction of link E-B, from ring 523, to ensure that the link is only marked in one direction.

Figure 7:
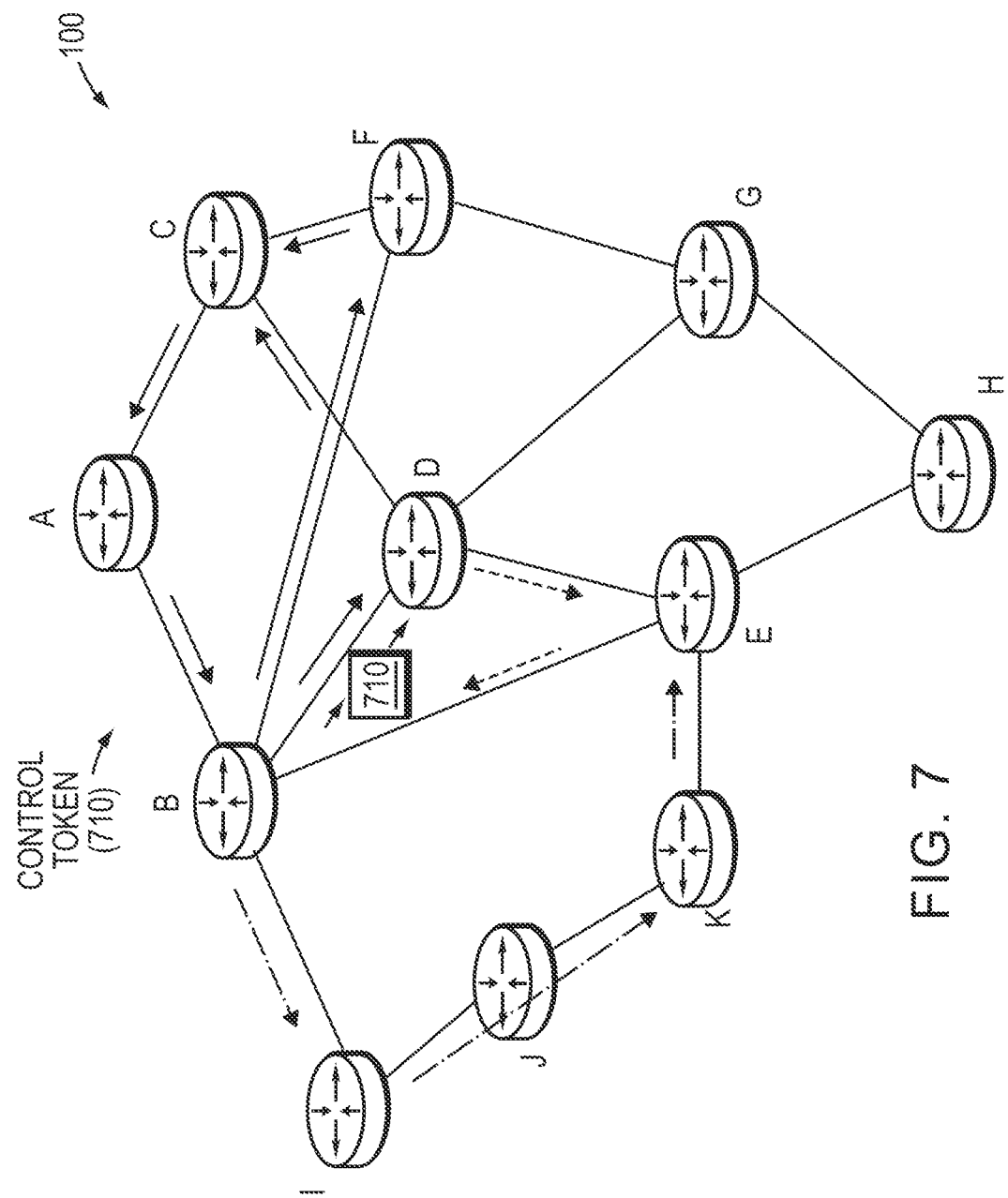

When the performing node has completed the calculations for each of its neighbors, it too passes the control token (710 in FIG. 7) as described above to a chosen neighbor along the ring direction to that neighbor (e.g., to node D). Note that the performing node may prefer a link that was previously marked when that performing node originally received the control token itself (410). Accordingly, node B may choose node D over node I, since the B-D link was previously marked by node A. (Otherwise, chances may increase that a tangent may be taken, e.g., a backdoor, where links may not be marked correctly.)

Figure 8:
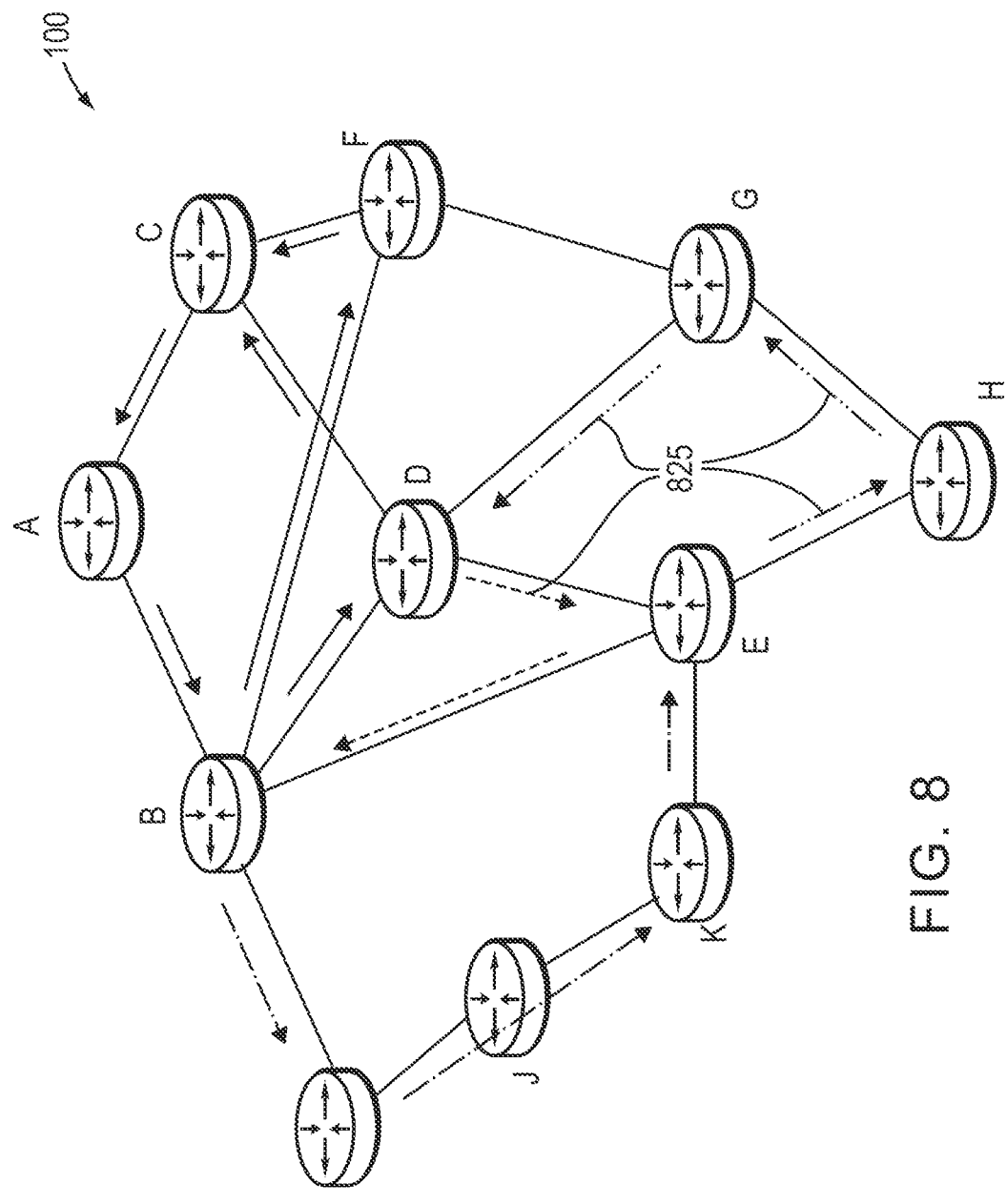

Following the same process above, node D may create two lists of neighbors, those with marked links and those without, and then chooses a neighbor from the first list to begin ring discovery/marking. Suppose, for example, node D chooses node C. In this instance, no unmarked links are found, so node D may move to a next neighbor reached through a marked link. As shown in FIG. 8, when node D selects node E and looks for a loop/ring (e.g., runs a directed SPF back to itself), it may discover ring 825, path E-H-G-D. Since some of the links are not marked, node D sends a marking token in the direction of the previously marked links, and the unmarked links may then be marked, accordingly, as described above.

Upon reaching a successive node having only neighbors that have already received the control token, and thus no neighbors that have not already been explored/marked, that successive node may "unwind" the token back to previous nodes in the computer network. In other words, if the node the token is passed to has no further neighbors to pass the token to, it unwinds the token by passing it back to its parent (the node from which the token was received). If the parent has nodes which have not had the token before, it will pass the token to those neighbors. If the parent has no neighbors which have not received the token in the past, it will unwind the token to its parent. At some point, all the nodes in the network will have received the control token. Also at this point, all the appropriate links in the network will have been marked as either being on the first or second topology (except link F-G, explained below).

According to the embodiments herein, once the directions are marked, each node may store the marked direction as a first topology 247, and a second direction opposite that marked direction as a second topology 248 that is link-disjoint from the first topology. Because the algorithm relies on counter-rotating rings, the cost characteristics of the two topologies discovered will be as identical as the two-way cost symmetry in the underlying network. That is, if all links have the same costs in both directions, the costs in the two topologies would be the same. Generally, this cost would not be the best cost possible (e.g., through straight routing), but it provides a good and balanced cost, i.e., one topology will not get the best cost, while the second topology gets a substantially worse cost. Instead, the two topologies are acceptable in cost, and are balanced.

Various routing techniques (overlay routing protocols) may be executed based on the pair of link-disjoint topologies, thus the two topologies represent two optimal paths through the network to and from each point on the network. For instance, routing protocols may create multi-topology routing (MTR) instances, source routing paths, tunnels (e.g., MPLS), etc., to allow the use of the separate topologies. Various types of packet transmission may then take advantage of the disjoint topologies, such as load balancing or fast reroute (FRR), where if one topology fails, quickly rerouting the packet transmission to the second topology without having to reconverge the network. Also, "live-live" packet transmission may be performed from an initiating node by transmitting a first packet on the first topology and transmitting a second identical packet on the second topology to a single destination. In this manner, redundant packets traverse the network to their shared destination, where if only one topology fails, one of the redundant packets will reach the destination.

If a link or node fails in the network, creating a network change, it is possible to reconverge the topologies. In response to detecting a network-changing event, the first and second topologies may be reconverged based on the changed network by either total re-computation (i.e., starting over at the starting point), or some other more incremental process. For instance, in one embodiment, the node closest to the starting point to which the failed link is attached can clear the markings on all the links it marked in the original process, and reconverge those links using the same process (and each successive node would then have to reconverge as it receives the control token again).

Figure 9:
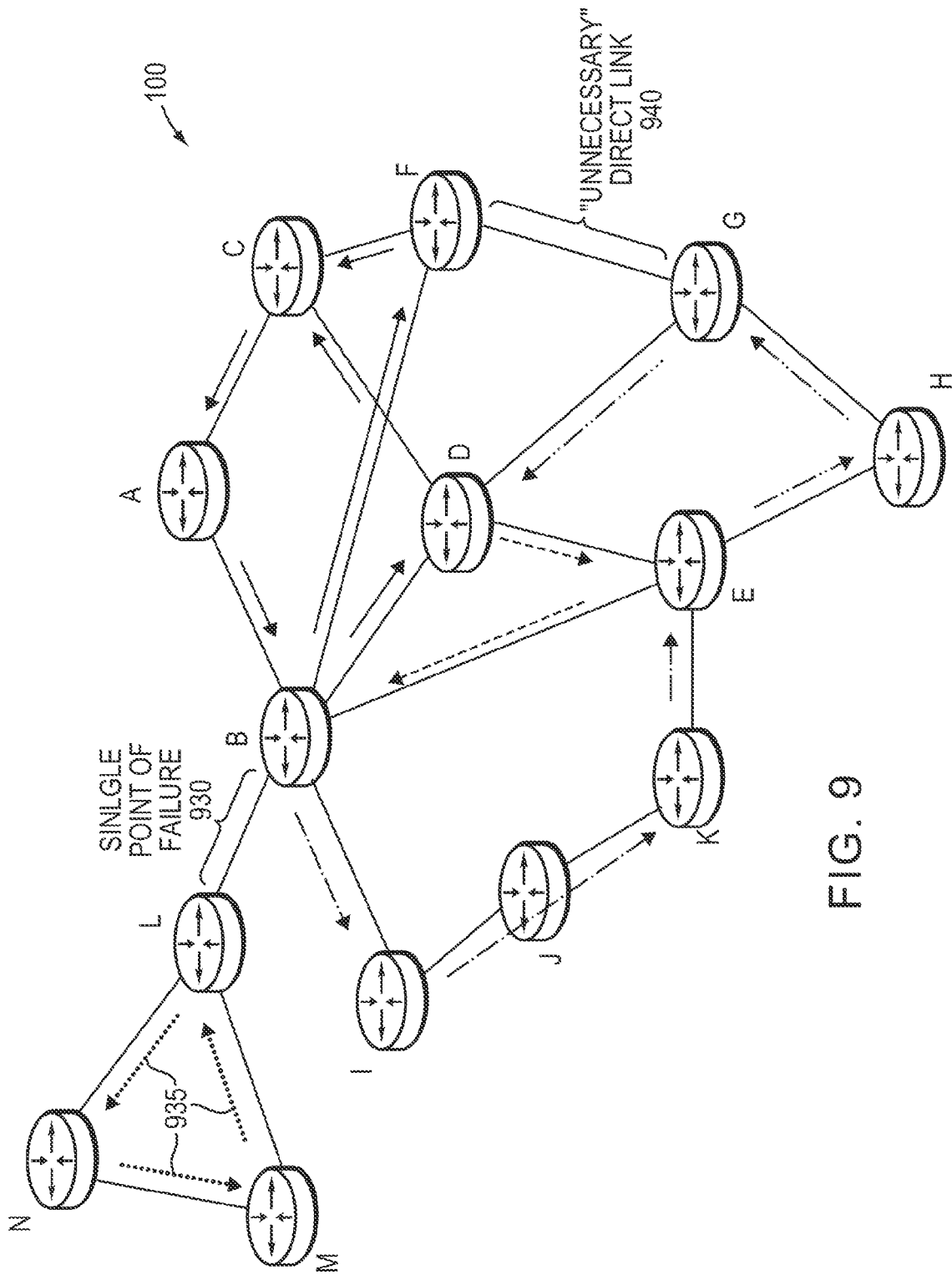
FIG. 9 illustrates an example single point of failure topology.

As noted above, there may be instances where a ring cannot be found through a particular neighbor. With reference to FIG. 9, nodes L-N have been added to the network 100, where node L is connected to node B. In this case, when B is discovering rings, there is a single point of failure (930) in the network, as B is unable to loop back to itself through node L. Accordingly, there is no way to set up two link-disjoint topologies through node L, as whatever lies behind that neighbor only has one path to it, and hence there cannot be diverse paths into that part of the network (nodes L-N). At this point, the algorithm could take several possible options. For instance, in a first embodiment, such as where resiliency requirements are strict, these nodes (L-N) may be left off either topology, i.e., not storing the neighbor node or any links beyond the neighbor node in either the first or second topology. Alternatively, if preserving connectivity is more important than resiliency, one of the two topologies may be chosen (e.g., randomly), and both the inbound and outbound link to this neighbor may be marked as being on the same topology, and pass the token to this neighbor, noting it must place all links to all its neighbors on this single topology. That is, the entire set of links and nodes beyond this single point of failure must be placed on one of the two topologies (e.g., storing all links beyond the neighbor node as within the first topology), so loops don't result by moving traffic from one topology and to the other topology. Notably, tunnels could be built over the single point of failure link, such that bidirectionality on the two topologies may be maintained on "separate" virtual links for the single point of failure link (thus allowing nodes on the other side of the link in question to maintain link-disjoint topologies, ring 935, if available), however such a solution is still limited to the single point of failure of that one particular link (B-L).

Note further that the link between node F and G is shown as being unmarked, as noted above. This link is technically "unnecessary," since all of the established rings touch all of the nodes in the network, hence all the nodes are reachable on either topology. In particular, during operation of the algorithm above, since there are no rings that include that link without utilizing oppositely-directed links (e.g., via F-C-D or F-B-D), neither node F nor node G would be able to find an appropriate ring back to themselves through each other (i.e., from node F through node G and vice versa). Accordingly, while the marked path to reach each other is not the shortest (which would be the F-G direct link), this circumstance is a tradeoff according to the techniques herein. As a more complex alternative to alleviate this tradeoff, it could be determined that the direct unmarked link 940 (shown in FIG. 9) is not used in any ring, and as such, the marked direction on that link (and thus the corresponding directional link-disjoint topologies) could be arbitrarily selected. In particular, since there is no concern for the algorithm to reach a dead-end and not reach nodes, nor for any associated ring rotation to be improperly chosen, such "short-cuts" (direct links interconnecting two rings of any rotation) may be beneficial to the overlaying routing protocol to determine shorter paths than the original underlying topology calculation, while still maintaining link-disjoint topologies, accordingly.

Figure 10:
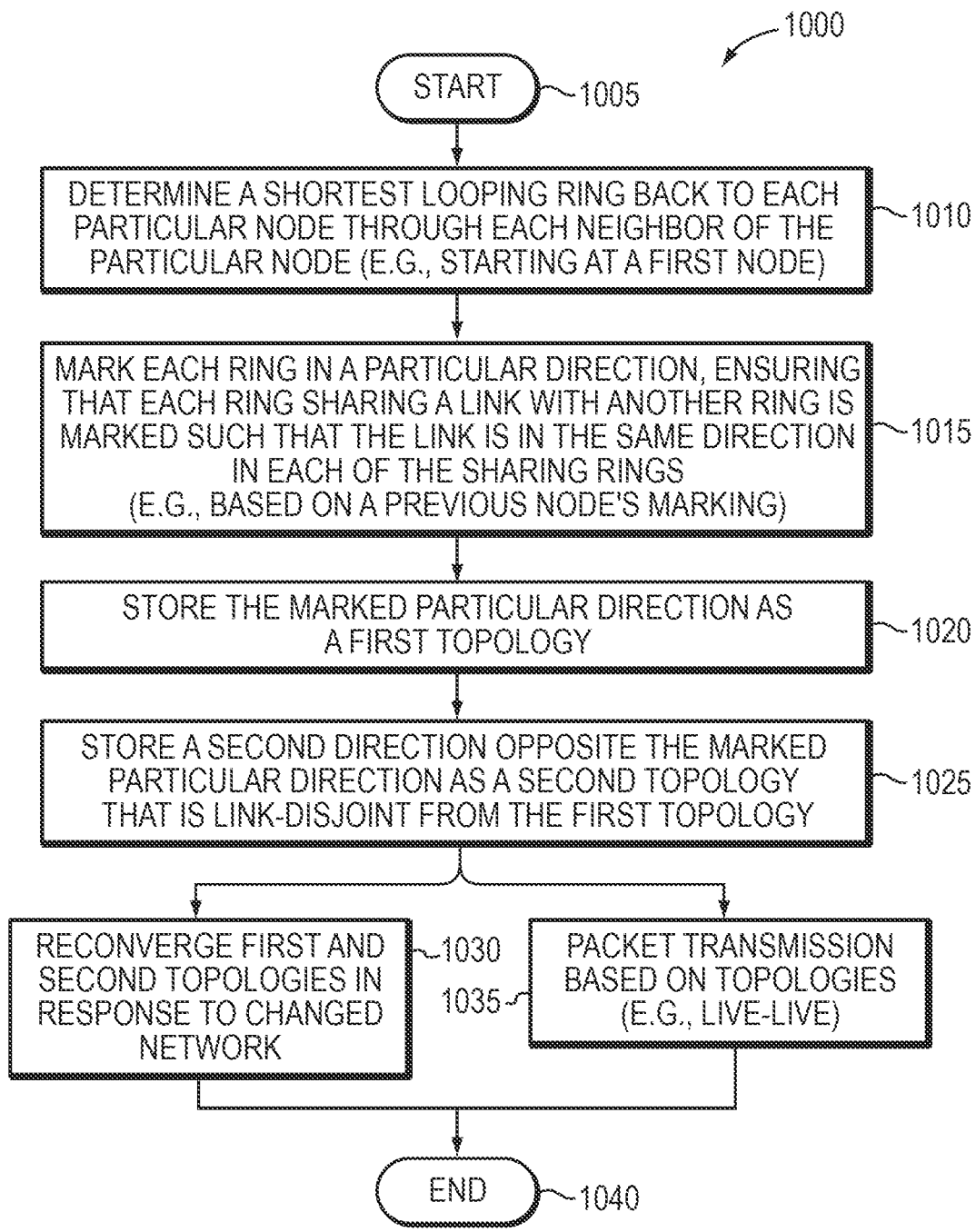
FIG. 10 illustrates an example simplified procedure for creating optimal link-disjoint topologies.

In summation, FIG. 10 illustrates an example simplified procedure for creating optimal link-disjoint topologies in accordance with one or more embodiments described herein. The procedure 1000 starts at step 1005, and continues to step 1010, where each node 200 of the network 100 determines a shortest looping ring back to itself through each of its neighbors, illustratively starting at a first node (starting point), and recursively passing through each node of the network in turn. In step 1015, each ring is marked in a particular direction, ensuring that each ring sharing a link with another ring is marked such that the link is in the same direction in each of the sharing rings (e.g., based on a previous node's marking), as described herein. In step 1020, the marked particular direction may be stored as a first topology, and in step 1025, the second direction opposite the marked particular direction may be stored as a second topology that is link-disjoint from the first topology. In response to any network changes, the topologies may be reconverged in step 1030, and in step 1035, packets may be transmitted based on the topologies, as described above (e.g., live-live, etc.). The simplified procedure 1000 ends in step 1040.

Figure 11:
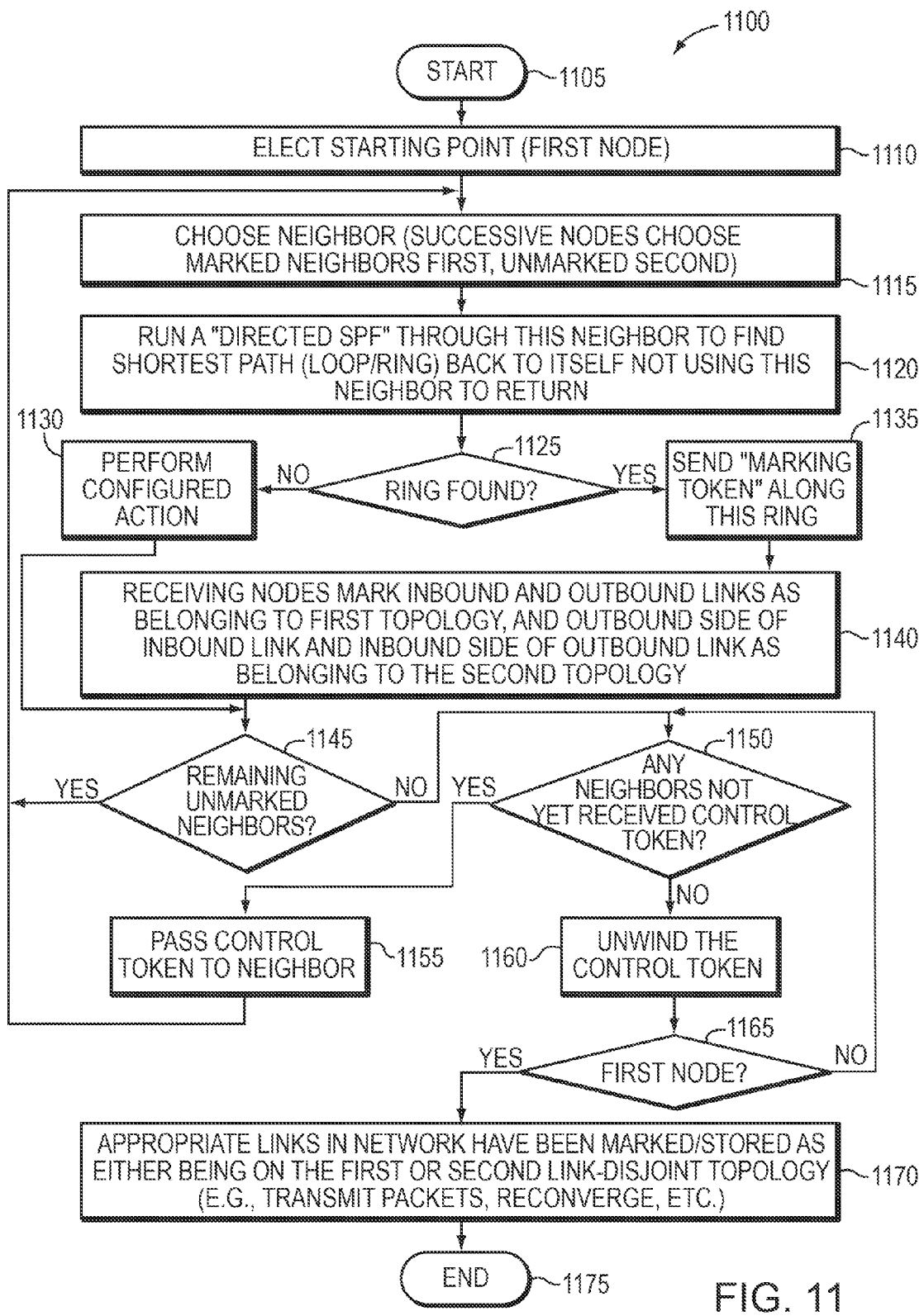
FIG. 11 illustrates another, more detailed, example procedure for creating optimal link-disjoint topologies.

As further detail, FIG. 11 illustrates another example procedure for creating optimal link-disjoint topologies in accordance with one or more embodiments described herein. The procedure 1100 starts at step 1105, and continues to step 1110, where a starting point/first node is elected, e.g., node A. In step 1115, this starting point chooses a neighbor, and in step 1120, runs a "directed SPF" (or other algorithm) through this neighbor to find the shortest path (loop/ring) back to itself not using this neighbor to return. If no ring is found in step 1125, then in step 1130 a configured action as described above may be performed (e.g., single topology marking, ignoring the neighbor, etc.). If, on the other hand, in step 1125 a ring is found, then in step 1135 a "marking token" 310 may be sent along the ring. In step 1140, nodes receiving this marking token may mark the inbound and outbound links as belonging to the first topology (e.g., marked in the first direction and stored in the first topology), and the outbound side of the inbound link and the inbound side of the outbound link as belonging to the second topology (e.g., marked in the other/second direction and stored in the second topology).

If the starting node has further unmarked neighbors in step 1145, then the procedure 1100 continues to step 1115 to repeat the marking process for the other neighbors. If, however, there are no additional unmarked neighbors, then if there are any neighbors that have not yet received a control token 410 in step 1150, the control token is passed to a chosen neighbor in step 1155, and the procedure returns to step 1115 for that successive node/neighbor to mark its own rings (e.g., notably choosing marked neighbors first, and unmarked neighbors second when determining which rings to mark, as described above).

When a particular node reaches step 1160 having no further neighbors to mark in step 1145, and no neighbors that have yet to receive a control token in step 1150, then in step 1160 the control token may be unwound as noted above, passing the token to previous neighbors so they may explore their additional neighbors further, assuming any remain in step 1150. When the unwound token reaches the starting point in step 1165, then no nodes in the network have unmarked neighbors or neighbors that have yet to receive the control token. As such, in step 1170 all (appropriate) links in the network have been marked/stored as either being on the first or second link-disjoint topology. Packets may then be transmitted accordingly, and/or the topologies may be reconverged in response to network changes, etc. The procedure 1100 ends in step 1175.

The novel techniques described herein create optimal link-disjoint topologies in a computer network. By recursively finding multiple link-disjoint topologies within a network in the manner described above, assuming they exist, the novel techniques provide for balanced, e.g., optimal, topologies, such that one does not provide paths that are vastly longer or more costly than their counterpart path. Also, the dynamic creation alleviates the need for cumbersome and inefficient manual configuration of link-disjoint topologies.

While there have been shown and described illustrative embodiments that create optimal link-disjoint topologies in a computer network, it is to be understood that various other adaptations and modifications may be made within the spirit and scope of the embodiments herein. For example, the embodiments have been shown and described herein primarily based on bidirectional links. However, the embodiments in their broader sense are not so limited, and may, in fact, be used with parallel unidirectional links in opposing directions, assuming substantially equal costs. That is, pairs of unidirectional links could be "matched" logically, so they appear to be a single bidirectional link to the algorithm described above. Also, given a shared risk link group (SRLG) along a particular ring, all links of the SRLG may be marked in a same direction to remain on a single topology.

Moreover, while the above techniques are described as originating at a starting point node, a distributed approach may also be utilized. For instance, in order to preserve the ability to properly mark ring directions in a distributed approach, since each ring is marked based on a previous ring marking if available, each node that desires to create diverse topologies (e.g., those with destinations behind them that care) may initiate the process for their represented destinations, such that each destination in the network may have its own link-disjoint topologies. These topologies may then be distributed within the network so any node in the network routing to those particular destinations may utilize the appropriate topologies.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (and non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, from each node in a computer network, a shortest looping ring back to the node through each neighbor of the node;
   marking each ring in a particular direction, ensuring that each ring sharing a link with another ring is marked such that data flow over the shared link is in the same direction in each of the sharing rings, to create a plurality of marked rings;
   storing the marked particular direction of the plurality of marked rings as a first topology;

storing a second direction opposite the marked particular direction of the plurality of marked rings as a second topology that is link-disjoint from the first topology;

in response to a network change, reconverging the first and second topologies; and transmitting data packets over the network based at least in part upon the reconverged first and second topologies.

2. The method as in claim 1, further comprising:
starting the marking at a first node of the computer network; and
marking, at each successive node in the computer network, each successive ring based on a previous node's marking.

3. The method as in claim 2, further comprising:
marking first, at each successive node, a first set of successive rings based on the first node's marking; and
marking second, at each successive node, a second set of successive rings that do not share links with previously marked rings.

4. The method as in claim 2, further comprising:
passing a token to a neighbor node to indicate to each successive node receiving the token that the receiving node is to mark its rings.

5. The method as in claim 4, further comprising:
passing the token in a direction of a particular marked ring to reach the neighbor.

6. The method as in claim 4, further comprising:
reaching a successive node having only neighbors that have already received the token; and, in response
unwinding the token back to previous nodes in the computer network.

7. The method as in claim 1, wherein determining comprises:
utilizing a selection algorithm selected from a group consisting of: a shortest path first (SPF) algorithm, an explorer algorithm, and a routing information protocol (RIP) path computation algorithm.

8. The method as in claim 1, further comprising:
determining that a neighbor node does not provide a looping ring back to the node; and in response, either:
i) storing all links beyond the neighbor node as within the first topology; or
ii) not storing the neighbor node or any links beyond the neighbor node in either the first or second topology.

9. The method as in claim 1, further comprising:
determining, from each node in a computer network, a plurality of equal cost shortest looping rings back to the node through a particular neighbor of the node; and, in response
marking each equal cost ring in a particular direction, ensuring that each ring sharing a link with another ring is marked such that the link is in the same direction in each of the sharing rings.

10. The method as in claim 1, wherein marking comprises:
passing a marking token along the ring to be marked.

11. The method as in claim 10, further comprising:
marking, at each node along the ring, an inbound link and outbound link of the passed marking token as the particular marked direction, thereby being stored in the first topology; and
marking, at each node along the ring, an outbound side of the inbound link and an inbound side of the outbound link of the passed marking token as the second direction opposite the first direction, thereby being stored in the second topology.

12. The method as in claim 1, further comprising:
marking all links of a shared risk link group (SRLG) along a particular ring in a same direction.

13. The method as in claim 1, further comprising:
detecting a network-changing event that creates a changed network; and in response,
reconverging the first and second topologies based on the changed network.

14. The method as in claim 1, further comprising:
performing live-live packet transmission from an initiating node by transmitting a first packet on the first topology and transmitting a second identical packet on the second topology to a single destination.

15. An apparatus, comprising:
one or more network interfaces adapted to communicate with neighbor nodes in a computer network;
a processor coupled to the network interfaces and adapted to execute one or more processes; and
a memory adapted to store a process executable by the processor, the process when executed operable to:
determine a shortest looping ring back to the apparatus through each neighbor node;
mark each ring in a particular direction, ensuring that each ring sharing a link with another ring is marked such that data flow over the shared link is in the same direction in each of the sharing rings, to create a plurality of marked rings;
store the marked particular direction of the plurality of marked rings as a first topology;
store a second direction opposite the marked particular direction of the plurality of marked rings as a second topology that is link-disjoint from the first topology;
in response to a network change, reconverge the first and second topologies; and
transmit data packets over the network based at least in part upon the reconverged first and second topologies.

16. The apparatus as in claim 15, wherein the process when executed is further operable to:
mark each ring as a successive ring based on a previous node's marking.

17. The apparatus as in claim 15, wherein the process when executed is further operable to:
pass a marking token along rings to be marked.

18. The apparatus as in claim 17, wherein the process when executed is further operable to:
mark an inbound link and outbound link of the passed marking token as the particular marked direction, thereby being stored in the first topology; and
mark an outbound side of the inbound link and an inbound side of the outbound link of the passed marking token as the second direction opposite the first direction, thereby being stored in the second topology.

19. A system, comprising:
a plurality of interconnected nodes in a computer network, wherein each node is configured to:
determine a shortest looping ring back to the node through each neighbor of the node;
mark each ring in a particular direction, ensuring that each ring sharing a link with another ring is marked such that data flow over the shared link is in the same direction in each of the sharing rings, to create a plurality of marked rings;
store the marked particular direction of the plurality of marked rings as a first topology;
store a second direction opposite the marked particular direction of the plurality of marked rings as a second topology that is link-disjoint from the first topology;

in response to a network change, reconverge the first and second topologies; and transmit data packets over the network based at least in part upon the reconverged first and second topologies.

20. The system as in claim 19, wherein the nodes are configured to start the marking at a first node of the computer network, and each successive node is configured to mark each corresponding successive ring based on a previous node's marking.

21. A tangible non-transitory computer-readable media having software encoded thereon, the software when executed operable to:

determine a shortest looping ring back to a particular node through each neighbor of the particular node;

mark each ring in a particular direction, ensuring that each ring sharing a link with another ring is marked such that data flow over the link is in the same direction in each of the sharing rings, to create a plurality of marked rings;

store the marked particular direction as a first topology of the plurality of marked rings;

store a second direction opposite the marked particular direction of the plurality of marked rings as a second topology that is link-disjoint from the first topology;

in response to a network change, reconverge the first and second topologies; and transmit data packets over the network based at least in part upon the reconverged first and second topologies.

22. The computer-readable media as in claim 21, wherein the software when executed is further operable to:

start the marking based on a first node of the computer network; and mark, for each successive node in the computer network, each successive ring based on a previous node's marking.

* * * * *